J. FLOWER.
TAPS AND DIES.
No. 189,719. Patented April 17, 1877.
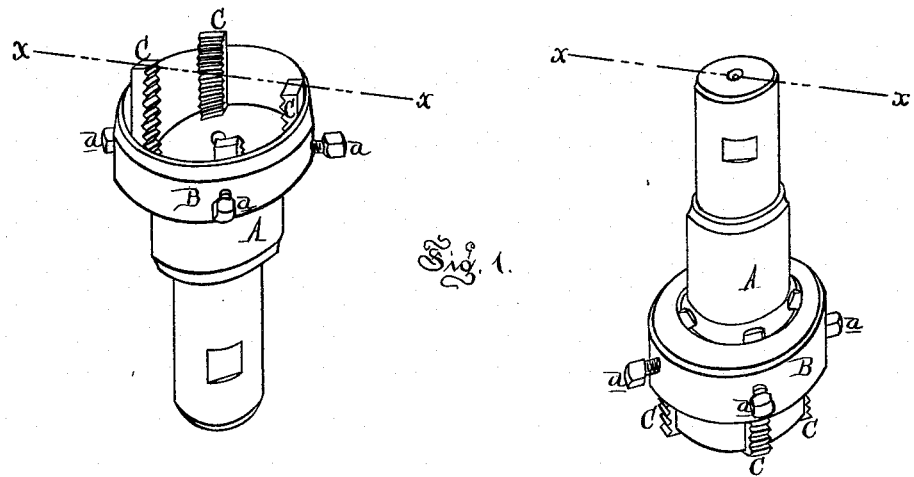
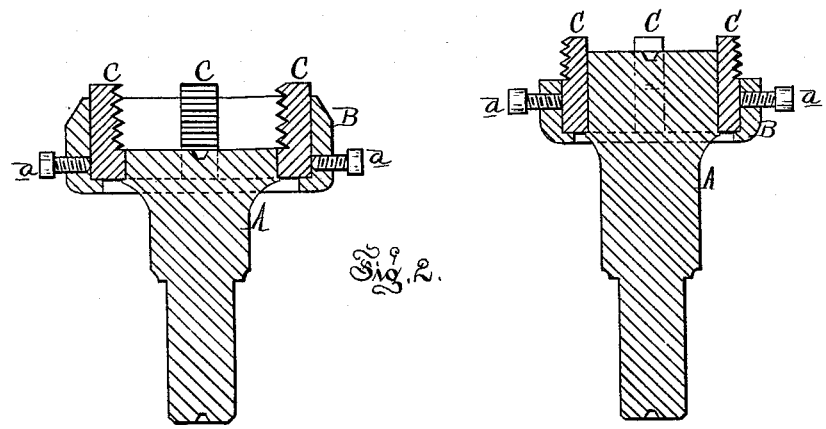

UNITED STATES PATENT OFFICE.

JAMES FLOWER, OF DETROIT, MICHIGAN.

IMPROVEMENT IN TAPS AND DIES.

Specification forming part of Letters Patent No. 189,719, dated April 17, 1877; application filed February 19, 1877.

To all whom it may concern:

Be it known that I, JAMES FLOWER, of Detroit, in the county of Wayne and State of Michigan, have invented an Improvement in Taps and Dies, of which the following is a specification:

The object I have in view is to construct a tap or a die with removable chaser-cutters, which can be removed for grinding when dull or to be replaced by others when worn out, thereby avoiding the excessive cost of tools of large diameters, and their total loss when their threads have become worn.

My invention consists in a chuck-stock, radially grooved at the periphery to receive the cutters, which are inclosed by a flanged collar resting upon the head of the stock, the whole being secured together by set-screws tapped through said collar to impinge upon said cutters. These tools are more especially adapted to the chasing of short screws in or upon fittings where such screws have a diameter greatly in excess of their length.

Figure 1 is a perspective view of a tap and a die of my improved construction. Fig. 2 is a vertical section of the same at $x\ x$.

In the drawing, A represents a head or stock, having a shank for chucking it in the lathe or screwing-machine. Four radial grooves are cut in the periphery to receive the chaser-cutters C, which are held therein by dropping over them a collar, B, which is flanged to rest against the head of the stock, and they are secured by set-screws $a$, tapped through said collar to impinge on said cutters, whose inner ends abut against the collar-flange which gages them to a uniform depth.

These cutters are cheaply made from square bar-steel, relieved on the backs of the threads, to make them cut easy, and sloped behind the radial line on the cutting-face to prevent "digging" into the work. When dull, they may be taken out and ground on the face before replacing, and when worn out are replaced by others at a small cost.

Solid taps of large diameter are costly to make and heavy to use. If much worn they can rarely be used again if the temper is drawn, the threads run over in a lathe and the tool retempered, as they are almost invariably warped, cracked, or otherwise spoiled in the latter process. Dies of the usual construction are open to the same objections, although in a lesser degree.

What I claim as my invention is—

In a screw-cutting tool, substantially as described, and in combination, removable chaser-cutters, the radially-slotted chuck-head to receive said cutters, and the flanged collar and set-screws to secure them in their relative positions, substantially as set forth.

JAMES FLOWER.

Witnesses:
H. F. EBERTS,
H. S. SPRAGUE.